United States Patent [19]

Stukenbrock

[11] 4,085,420
[45] Apr. 18, 1978

[54] LIGHT PIPE IMAGE DISPLAY

[76] Inventor: Heiner Stukenbrock, Prussentrift 29, 3000 Hannover, Germany

[21] Appl. No.: 735,289

[22] Filed: Oct. 26, 1976

[30] Foreign Application Priority Data

Oct. 30, 1975 Germany .............................. 2548589

[51] Int. Cl.² .......................... H04N 9/12; H04N 3/02
[52] U.S. Cl. ...................................... 358/56; 358/200; 358/901
[58] Field of Search ................. 358/200, 901, 230, 60, 358/231–239, 289, 290; 350/117

[56] References Cited

U.S. PATENT DOCUMENTS

| Re. 29,094 | 12/1976 | Price | 358/231 X |
| 2,354,591 | 7/1944 | Goldsmith | 358/901 X |
| 2,996,634 | 8/1961 | Woodcock | 358/901 X |
| 3,130,026 | 4/1964 | Manning | 358/901 X |
| 3,255,357 | 6/1966 | Kapany et al. | 358/901 X |
| 3,267,209 | 8/1966 | Nagamori et al. | 358/237 X |
| 3,621,133 | 11/1971 | Baker et al. | 358/231 |

FOREIGN PATENT DOCUMENTS 808,744  2/1959  United Kingdom .................. 350/117

*Primary Examiner*—Robert L. Griffin
*Assistant Examiner*—Aristotelis M. Psitos
*Attorney, Agent, or Firm*—Dowell & Dowell

[57] ABSTRACT

Apparatus for displaying at a screen area a light image taken from an image source using light pipes to transmit component elements of the source image which are arranged in a pattern at the screen area to compose the display image on an enlarged scale, the light pipes being spaced apart at the screen area to provide the desired enlargement of the displayed image and to leave interstices through which sound can pass from a loudspeaker behind the screen, the image source being either a complete image whose component elements are continuously present, a scanned image where only part of the elements are actually present at the source at one time, or scanned series of individual image elements appearing successively in time, the necessary persistence to compose a complete image being in the observer's eye or being present in the apparatus as a luminescent substance added to the display screen or to the light pipes.

5 Claims, 6 Drawing Figures

LIGHT PIPE IMAGE DISPLAY

FIELD OF INVENTION

This invention relates to image display apparatus in which an image or elements of an image are introduced into the entrance ends of a system of fiber optic light pipes whose exit ends are flared and/or spaced to enlarge the elements of the image carried by the respective light pipes, the exit ends being arranged to form a composite screen of the desired image display size.

BACKGROUND AND PRIOR ART

Methods and apparatuses are known for converting electrically available information comprising image elements into optical images, but these apparatuses either have an unfavorable ratio of screen dimensions to structural depth, such as in the case of electron beam picture tubes for example; or insufficient image brightness in a bright environment; or, in the case of so-called flat picture screens, the direct electrical control of the individual image elements or color dots in the case of color television requires a complicated electronic control system and/or intermediate storage of the image content.

THE INVENTION

The invention is an apparatus for displaying at a screen area an image formed by light exiting from the exit ends of a pattern of light pipes whose light entrance ends are arranged to take light from an image source which may display either a whole image or scanned elements of an image, for instance a scanned television raster. The exit ends of the light pipes are spaced apart to form the size of image desired, and they may be viewed either directly by the observer or through a translucent diffusion screen. Moreover, a luminescent substance can be added to the screen or to the light pipes themselves to increase the persistence of the display. The exit ends of the light pipes may also be flared to an enlarged cross-section to provide the appearance of a more integrated image. Embodiments of the invention are illustrated in which the image source is a cathode ray tube raster, or multiple scanned light sources suitable to produce a color display, or a stationary picture image such as a microfilm. In view of the fact that the light exit ends of the light pipes are spaced apart in the screen area of the apparatus, it is possible to place a loudspeaker directly behind the screen so that its sound passes through the interstices between said pipe exit ends and directly toward the viewer.

The object of the invention is to provide apparatus for converting image contents, available as either complete smaller images or as scanned picture elements or as electrical information, into optical images, particularly television images.

It is the object of the present invention to provide apparatus for converting image content into enlarged optical images using apparatus which has a small structural depth compared to the area dimensions of the image without requiring direct electrical control of the individual component image elements at the image screen and without intermediate electrical storage of the image components as is often done in flat screen displays.

This purpose is accomplished by conducting light to every image element of a composite image screen from the rear of the image screen through individual light pipe conductors. The cross sectional area of each light pipe is small over the major portion of the path of the light, but it flares in the manner of a funnel shortly before the exit point of the light pipe to the size of the cross-sectional area of an individual image element of the composite screen. The light can be introduced into the light pipes at the rear of the image screen from any desired direction, in particular from a direction parallel to the image surface.

The degree of freedom in the selection of image source location and directional axis at the points of entrance of the light into the light pipes, and also the fact that their cross sectional areas along the lengths of the pipes are smaller than their cross sectional outlet area which form the composite screen, make it possible to construct a device with shallow structural depth.

The location and direction of entry of light into the light pipes will be determined, in addition to considerations of structural depth, by the type of brightness modulation and directional deflection employed for the light before it enters the light pipes.

A particularly shallow structural depth results from using a helical arrangement of the light entrance ends of the light pipes, about a helix axis which lies perpendicular to the image screen, the ends of the light conductors associated with a plurality of different image forming scan lines being arranged within each 360° of rotary scan along helical paths around the axis of rotation, and suitable light deflection means, for example, a rotating mirror means revolving around the helix axis at an appropriate fraction of the line scanning frequency. Such mirror means deflects one or a plurality of previously brightness modulated light beams to the light entrance ends of the light conductors.

It is another object to provide the light pipes with an appropriate luminescent substance whose persistence is used to provide an afterglow effect, such luminescent substance also being capable of excitation by various otherwise unusable lightwave lengths.

Further advantages of the above-described apparatus for producing optical images are its light weight compared to electron beam picture tubes; its ability to provide a precisely planar picture screen surface which makes it possible to build devices which have screen sizes of the order of magnitude of movie theater screens; and the capability of replacing individual components such as a light source or sources, as well as the various components parts of the light deflection and brightness modulation devices when needed.

THE DRAWINGS

Figure 1:
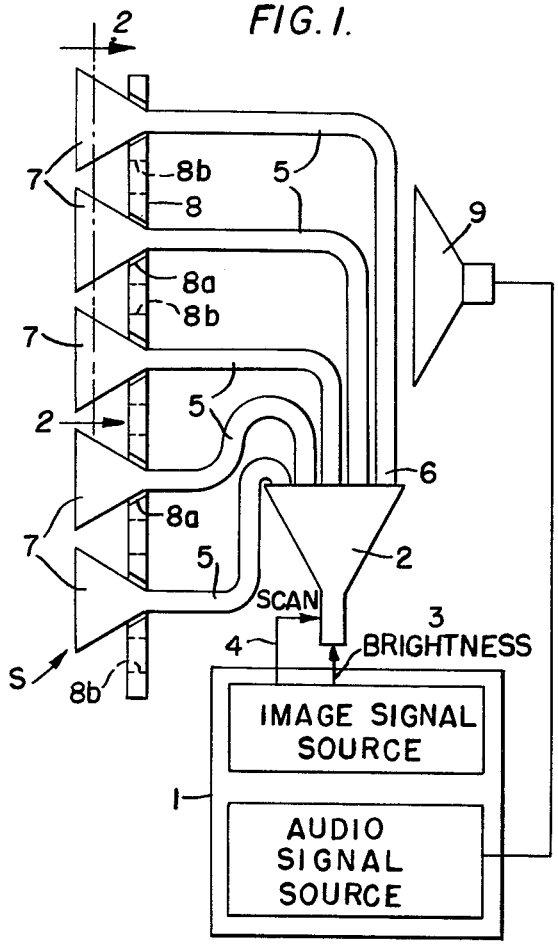
FIG. 1 is a side elevation view of an embodiment of the invention.
Figure 2:
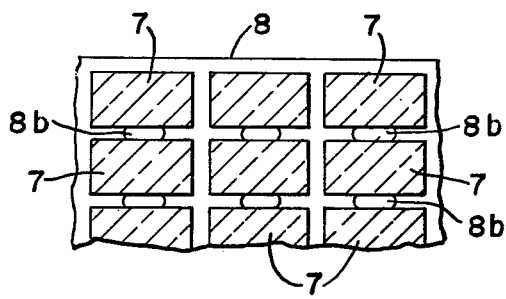
FIG. 2 is a cross-sectional view taken along line 2—2 of FIG. 1.

Referring now to the illustrative embodiments shown in the drawings, FIG. 1 shows an apparatus for displaying at a screen area S, an enlarged image taken from the image source which comprises a cathode ray tube 2. This first embodiment of the invention is particularly useful for providing enlarged television presentations, and shows a television receiver 1 having picture brightness and sweep outputs connected to a cathode ray tube 2 having a high intensity. The output on wire 3 controls the intensity of the beam within the cathode ray tube 2, and the scan output 4 scans the beam of the cathode ray tube to produce a television picture raster in the manner well know per se. A large number of light pipes 5 shown in FIG. 1 have light entrance ends 6 which are arranged in a pattern across the face of the cathode ray tube 2 and perpendicular thereto, with the light entrance ends 6 clustered close together. The light pipes 5 then extend toward the screen area S of the display, and each of the light pipes 5 flares to provide an enlarged exit end 7. The light pipe exit ends 7 have their axes arranged in a pattern which is geometrically similar to the pattern of the axes of the entrance ends 6, but with the centers of the axes at 7 spaced much further apart so as to provide an enlarged display. The light pipes are supported in a supporting plate 8 which has a pattern of pipe receiving holes 8a maintaining the exit ends of the light pipes in the desired raster pattern, see FIG. 2. The support plate 8 also has another series of holes 8b passing through the plate at locations which are spaced between the holes 8a, the holes 8b permitting sound from a loud-speaker 9 to pass between the light pipes 5 through the holes 8b, and pass outwardly through the screen area S between the exit ends 7. In this manner, the sound actually comes to the observer from directly behind the screen area S. A screen of this type can serve as a theater-size screen, provided the cathode ray tube 2 is of very high intensity, for instance, comprising a projection type tube which is generally well known at the present time.

Figure 3:
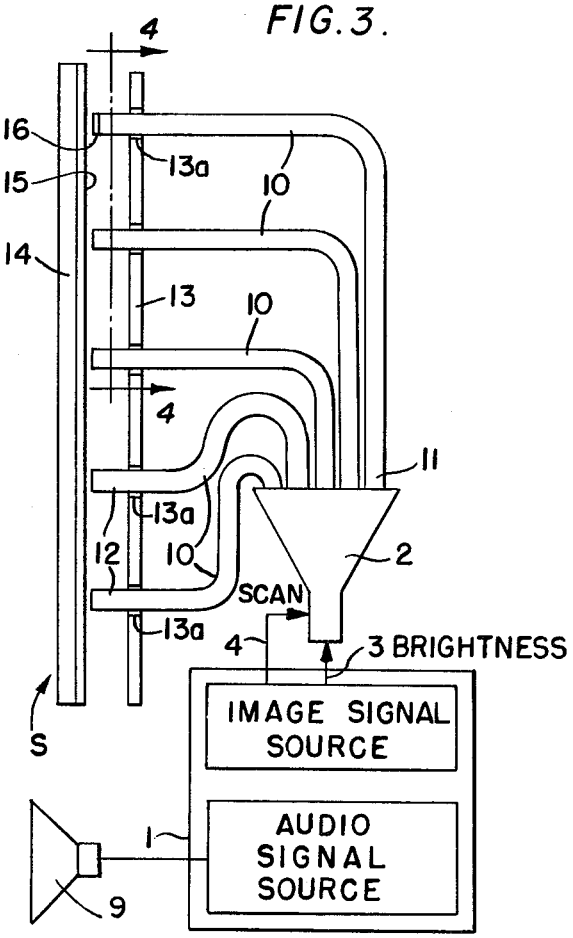
FIG. 3 is an elevation view similar to FIG. 1, but showing a modified embodiment of the invention.
Figure 4:
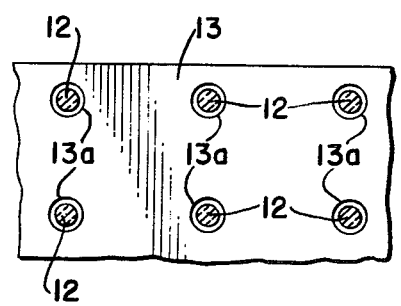
FIG. 4 is a sectional view taken along line 4—4 of FIG. 2.

Referring now to FIGS. 3 and 4, a modified form of the invention is illustrated in which the television receiver 1 is the same, the cathode ray tube 2 is the same, and the tube is driven by a similar brightness output 3 and by similar raster scan outputs represented by the line 4. However, in this modification the light pipes 10 are of the same cross-sectional area, or diameter from their light entrance ends 11 to their exit ends 12. These light pipes are clustered very close together in the pattern of an ordinary television raster at their entrance ends 11, but their exit ends 12 are spaced mutually further apart in order to produce the appearance of an enlarged picture in the screen area S. The exit ends are held in proper spaced relation by a support plate 13 having a pattern of regularly spaced holes 13a through it to support the exit ends as can be seen in FIG. 4. The exit ends 12 can be directly viewed by an audience seated at such a distance from the screen area S that the exit ends 12 appear to merge into a composite image formed by a large number of component image elements, or alternatively, this merging effect can be helped by placing a translucent screen 14 in front of the exit ends 12 of the light pipes so as to diffuse the light coming from the light pipes and to provide a picture which is somewhat more integrated by the translucent nature of the screen 14. A further improvement can be obtained by increasing the persistence of the image elements across the display by providing a luminescent coating 15 which is excited by the light passing through the light pipes, the persistence being determined by the nature of the selected luminescent coating, a phosphor-type of coating being well known for this purpose. As a still further alternative, the luminescent coating may be applied, not to the screen 14, but to the light pipes themselves, for instance as a coating 16 at one end of the light pipes as shown at the uppermost light pipe of FIG. 3.

Figure 5:
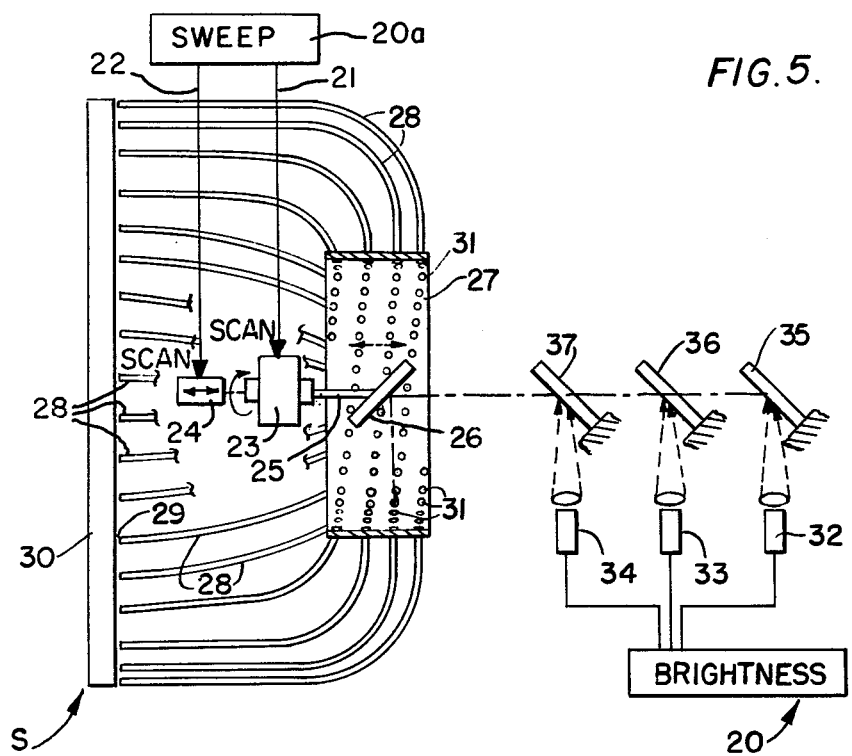
FIG. 5 is a schematic view shown partly in section of a further modified form of the invention.

Referring now to FIG. 5, this figure shows a further modified approach to the image source. In this case, an electronic system 20 provides a bi-directional translatory sweep output comprising a rotary scan on the wire 21 and a reciprocating scan on the wire 22, for instance in the nature of a sawtooth waveform. These scans drive a shaft member M causing it to rotate when driven by a rotary motor 23, and also causing it to be axially reciprocated when driven by a sawtooth scan motor 24. This mechanical shaft member carries at its left end a scan mirror 26 which rotates inside a support surface 27. The light pipe supporting surface 27 is preferably cylindrical about the shaft member M and is shown in cross-section. A large number of light pipes 28 have their exit ends arranged behind a translucent screen 30 located in the screen area S, and their light entrance ends 31 pass through a number of holes arranged in helical paths around the supporting surface 27. The light entrance ends 31 are directed squarely at the axis of rotation of the shaft. The light source means driven by the electronic system 20 includes one or more focused light beam sources 32, 33, and 34, three such sources being shown for color television reproduction, and these sources 32, 33, and 34 having their intensities controlled by the brightness portion of the electronic circuit 20. In the case of a monochromatic display, the focused light sources 32, 33 and 34 can be replaced by a single laser whose intensity is controlled by the electronic system 20.

As shown in FIG. 5, the light sources are all directed at a group of mirrors 35, 36, and 37 which are of the semi-transparent type so that the three different colored lights from the sources can all be passed toward the mirror 26 in a manner well known in the projection television art. The three light beams are superimposed and directed at the mirror 26 so that they will be reflected radially outwardly toward the support 27. The beams will be directed into the correct light pipes as the mirror 26 scans around the several helical paths of light pipe ends. In the case where the scan motor 24 represents the vertical scan sweep of a television receiver and the scan motor 23 represents the horizontal sweep of such a receiver, several helical paths can be provided, whereby the rotation rate for the horizontal scan need not be at the full television horizontal scan rate.

Figure 6:
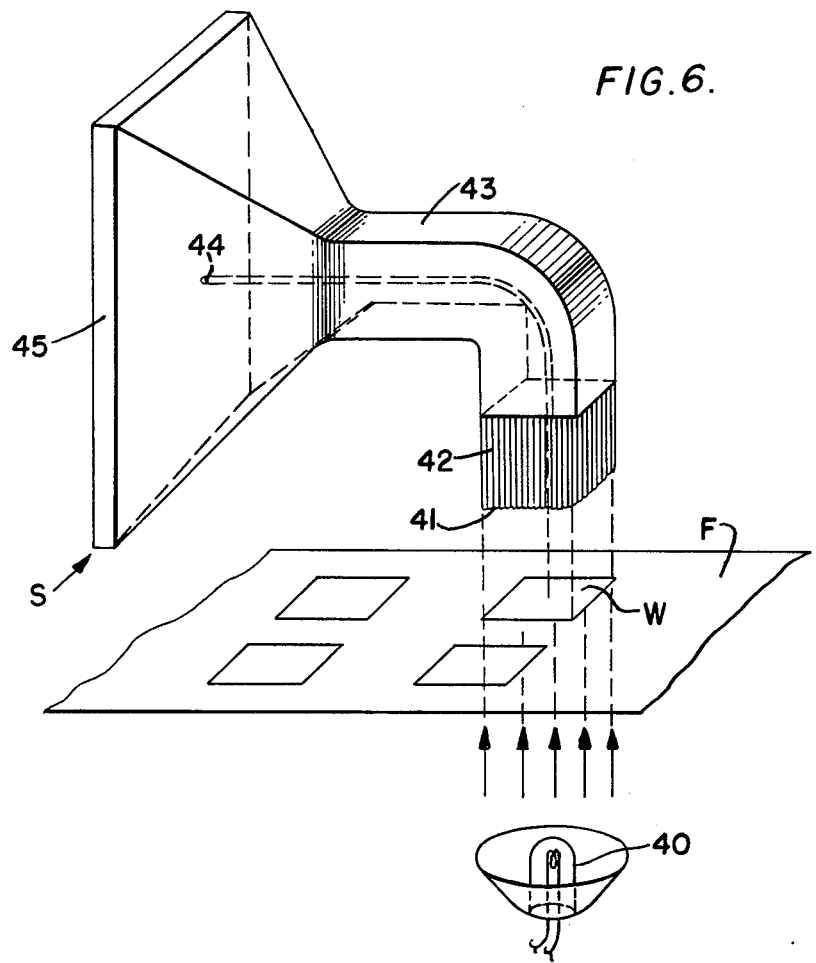
FIG. 6 is a perspective view of a still further modified form of the invention.

Referring now to FIG. 6, this figure shows a perspective view of a light pipe system for viewing microfilm, or other displays where the picture is complete. It comprises a light source 40 beneath the film member F and shining through one of its windows W. The film may comprise a Microfiche type of display having a number of different windows W. The light passes through one of these windows W and enters the light entrance ends 41 of a tightly clustered bundle of light pipes whose inlet ends are arranged in a pattern matching the dimensions of the window W. The light pipes 42 then extend through a housing 43 and their exit ends, represented by the end 44, are arranged in a geometrically similar pattern behind a screen 45 forming the face of the display. This would provide a display in which the exit ends 44 are mutually spaced apart further than the light entrance ends 41 so as to enlarge the displayed image.

It is to be understood the flared exit ends of the light pipes such as those shown in FIG. 1 can be used if desired in the modifications shown in FIGS. 3, 5, and 6 if desired. It is also to be understood that a translucent screen can be placed across the face of the flared exit ends shown in FIG. 1, this being another optional variation of the invention.

The invention is not to be limited by the illustrative embodiments shown and described, for obviously changes may be made within the scope of the following claims.

I claim:

1. Apparatus for displaying on a screen an image taken from an image source supplying light components forming elements of the image, the apparatus comprising:

(a) an image composing screen area;
    (b) separate light pipes for said light element components of the image, the light pipes including light entrance ends and light exit ends arranged at said image composing screen area and disposed to discharge light therefrom, the cross-sectional area of said light pipes over the major portions of their lengths including their entrance ends being smaller than the cross-sectional areas of the light pipes in the vicinity of their light exit ends, whereby the image at the screen is enlarged as compared with the image at the source;
    (c) a light pipe support operative to support said light entrance ends of said light pipes in a predetermined path;
    (d) said image source comprising a focused light beam which is brightness modulated according to light element components of the source image, a scanning mirror which is disposed to deflect the beam toward said light pipe support, and means for simultaneously rotating the mirror and shifting it back and forth with respect to its rotational axis to scan the beam progressively along said predetermined path and into the entrance ends of the light pipes; and
    (e) said light pipe support being curved about said rotational axis and supporting said entrance ends facing into the modulated beam as it is scanned along said predetermined path, thereby to compose the elements of said image in said screen area.

2. In apparatus as claimed in claim 1, said mirror being mounted at an oblique angle on a shaft lying on said axis of rotation, and said means for moving the mirror back and forth comprising means for translating the shaft bidirectionally along said axis as the shaft is rotated.

3. In apparatus as claimed in claim 2, said light pipe support comprising a cylindrical member through which said entrance ends extend in radial directions, and said predetermined path being a helical path.

4. In apparatus as claimed in claim 1, wherein the composite cross-sectional area of the light pipes at their exit ends is less than the image composing screen area, and the exit ends are uniformly spaced from each other in the plane of the screen area to leave interstices between adjacent exit ends.

5. In apparatus as claimed in claim 1, a luminescent substance located adjacent to the exit ends of the light pipes, the substance being excited by the focused light beam to glow and emit light at a desirable wavelength.

* * * * *